Feb. 14, 1933. B. F. SCHMIDT 1,897,216
SINGLE CABLE COWL MOUNTED GEAR SHIFT
Filed Feb. 9, 1931 3 Sheets-Sheet 2
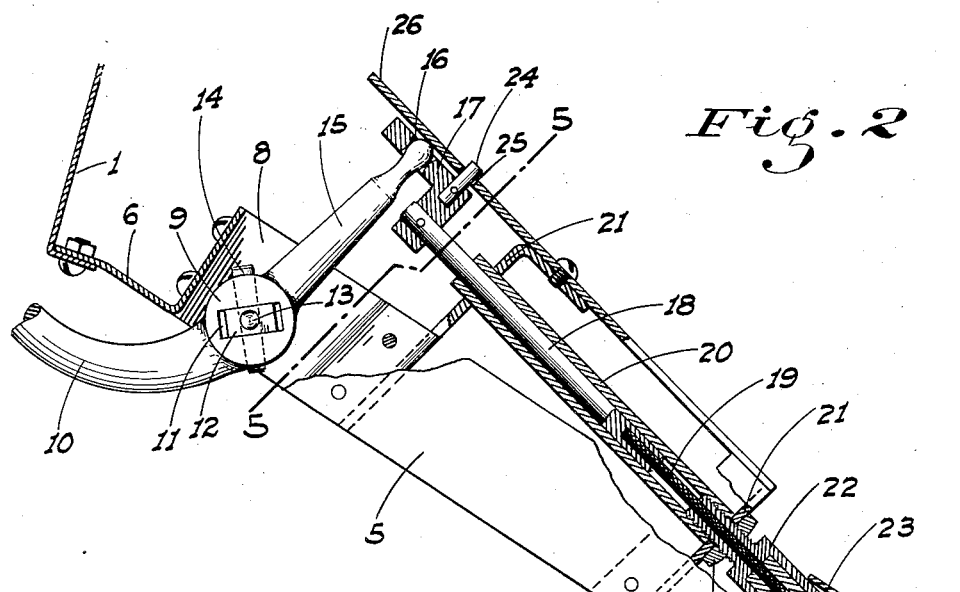
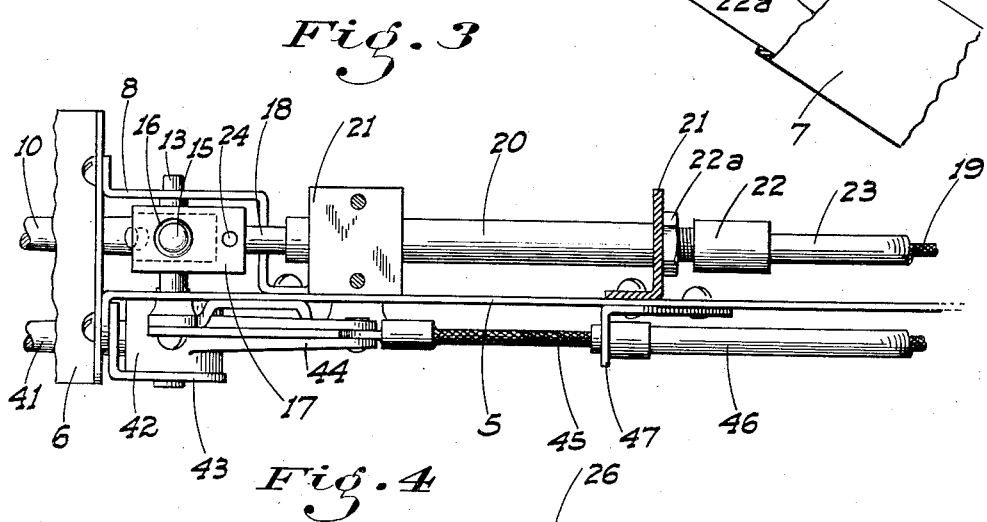
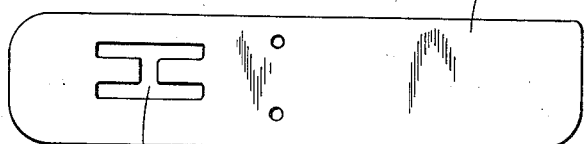
INVENTOR
B. F. Schmidt
BY
ATTORNEY

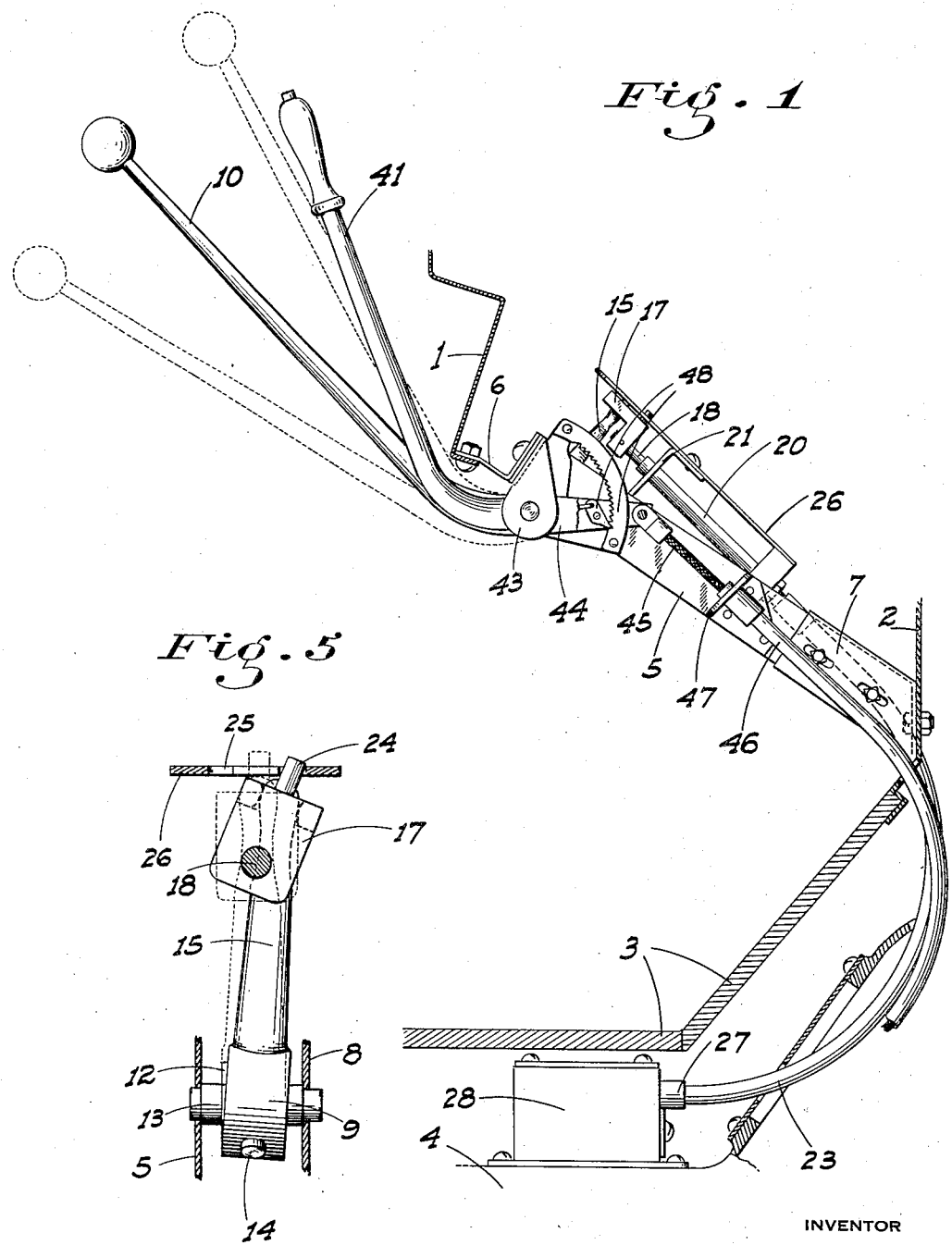

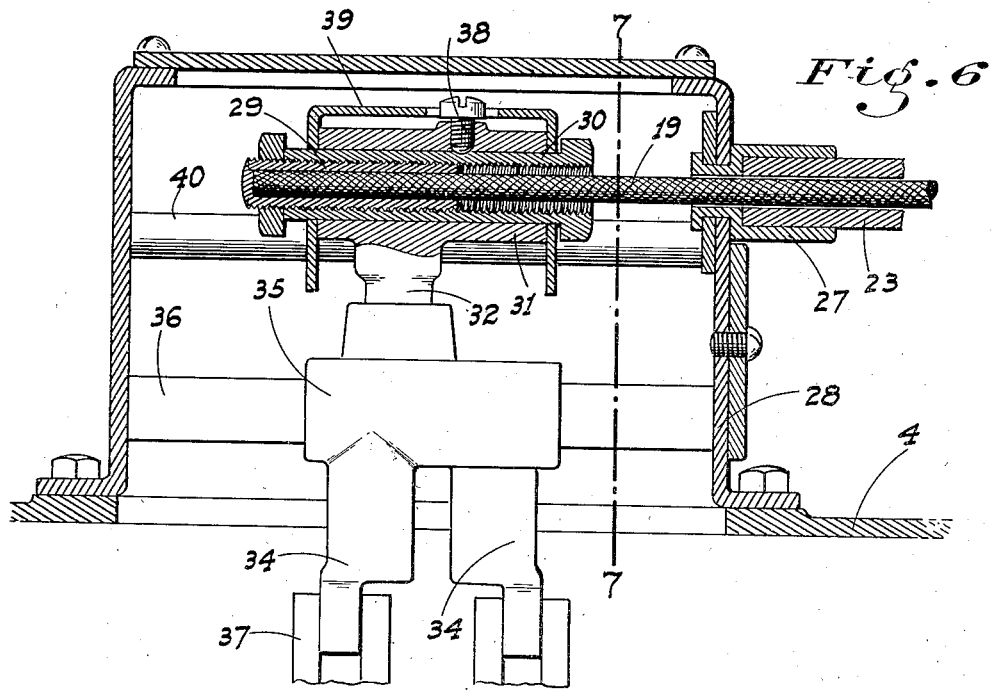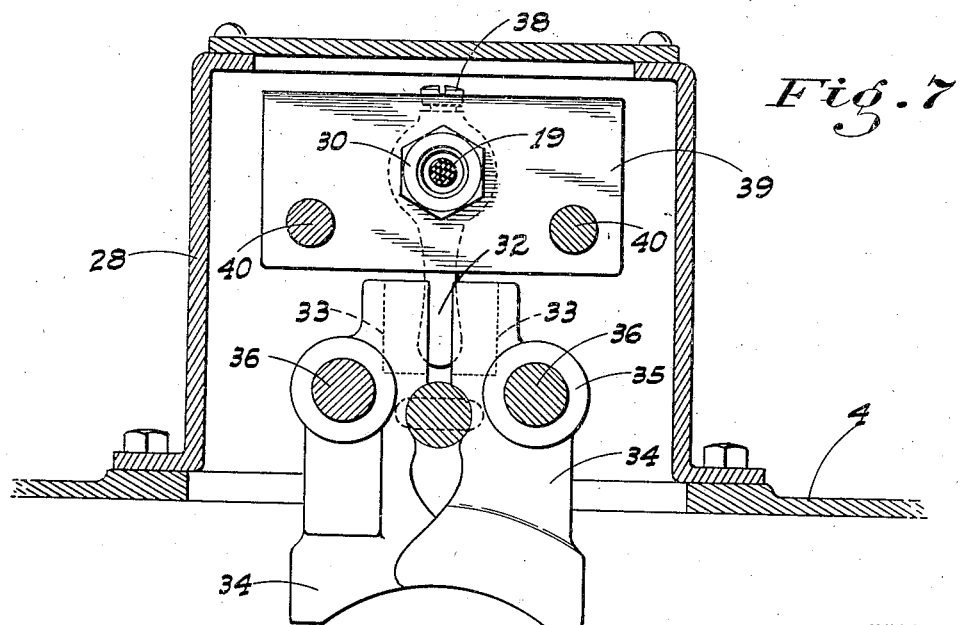

Patented Feb. 14, 1933

1,897,216

UNITED STATES PATENT OFFICE

BENJAMIN FRANKLIN SCHMIDT, OF LOS ANGELES, CALIFORNIA

SINGLE-CABLE COWL MOUNTED GEAR SHIFT

Application filed February 9, 1931. Serial No. 514,455.

This invention relates to gear shift mechanism for motor vehicles, and particularly to one of that type in which the control lever is mounted clear of the floor and which is connected to the shifting forks of the transmission by a single cable, capable of both rotative and longitudinal movement to effect the desired gear selection and shifting. Such a structure in general is shown in my Patent No. 1,690,180, dated November 6th, 1928. In the structure of this patent, however, the movement of the cable was effected by a handle device whose form and movements do not conform to what is now universally accepted as the standard shift. The operator of this previous device therefore, although conversant with the shift of practically all cars, had to learn to shift this structure before he could understand the operation and properly manipulate the same.

The principal object of the present invention is to avoid this objectional feature while retaining the advantages of this form of structure, by arranging for the cable to be manipulated by the movement of a shift lever of standard form and in the conventional or standard manner. The user may therefore operate this improved shift without any initial training or practice, or without an actual understanding of the mechanism of the structure being necessary.

I have also arranged the new mechanism so that it may be more rigidly mounted than the device in the above mentioned patent as well as of various other similar structures, and it is also designed so that it offers no intereference with any instruments which project in front of the in instrument board.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved gear shift mechanism shown in connection with an emergency brake operating structure.

Fig. 2 is a fragmentary enlarged longitudinal section of the upper portion of the gear shift mechanism.

Fig. 3 is a top plan view of the mechanism including the emergency brake feature, the H-slot plate being removed.

Fig. 4 is a top plan view of the H-slot plate.

Fig. 5 is a fragmentary cross-section taken on the line 5—5 of Fig. 2.

Fig. 6 is a longitudinal section of the transmission and of the shifting mechanism.

Fig. 7 is a transverse section taken on the line 7—7 of Fig. 6.

Referring now more particularly to the characters of reference on the drawings, the numeral 1 denotes the instrument board of a motor vehicle; 2 the vertical bulkhead between the engine and board and separating the driving and engine compartments, and 3 represents the flooring of the driving compartment, below which is the transmission housing 4, as usual.

The supporting frame of the improved control structure of the shift mechanism includes a longitudinally extending rigid plate 5, which is set on edge and disposed between the board 1 and the bulkhead 2. This plate is secured to the lower edge of the board by a suitable bracket 6, so that the adjacent end of said plate is some distance in front of the board; and to the bulkhead adjacent its connection with the sloping portion of the flooring by a bracket 7. This bracket has sliding engagement with the plate and is adjustably clamped thereto, so that the structure may be accommodated to variations in the space between the board 1 and the bulkhead 2. At the rear end of the plate 5, is another bracket plate 8, arranged in parallel and transversely operated relation thereto, and is rigid therewith and with the bracket 6 so that it forms a part of the supporting frame.

Between the plates 5 and 8, the hub 9 of the gear shift lever 10 projects. This lever extends rearwardly and upwardly from its hub a suitable distance as shown in Fig. 1, and adjacent the hub is formed with a curve or gooseneck so as to clear the bracket 6 and the instrument board with any setting of the lever. The hub is provided with a rectangular slot 11, extending transversely through the same, in which slot fits a crosshead 12, provided on its ends with trunnions 13, which are turnably supported in the plates 5 and 8. A pin 14 passes radially through the hub and the crosshead 12 at right angles to one face of the latter so that the hub may rock on the head in one direction about this pin as an axis.

An extension 15 on the lever projects upwardly and forwardly from the hub, the pin 14 being disposed so that the outer end of this extension will swing horizontally in a vertical transverse plane when the opposite end of the lever is correspondingly shifted. Said outer end of the extension swivelly engages an opening 16 provided in one arm of an L-shaped member 17. A rod 18 is secured to the other arm of the member 17 and projects forwardly therefrom, being connected at its forward end to a flexible cable 19, or the like, which extends to an operative connection with the shifting forks of the transmission as will be seen later. The rod 18 is slidably and turnably guided in a rigid sleeve 20, which is supported by plates 21 secured to the plate 5, to one side of the same. In the forward end of the sleeve a socket 22 is fixed, which receives and supports the adjacent end of a flexible housing 23 which surrounds and encloses the cable from end to end. Upstanding from the member 17 is a pin 24, which rocks in an H-slot 25, formed in a plate 26, which is supported by the plates 21 in parallel relation to and above the sleeve 20, and to the arm of the member 17, which is engaged by the lever extension.

By means of the above construction and arrangement of the parts it will be seen that the extent of the lateral shifting of the lever extension (on its turning about the pin 14) is limited by the length of the cross portion of the H-slot, while the extent of the longitudinally swinging movement of the lever extension (on its turning about the trunnions 13 as an axis) is limited by the length of the parallel side portions of the H-slot. With the lateral movement of the lever extension the member 17 is turned about the rod 18 as an axis, and to a greater arcuate extent than the turning movement of the lever. This is because the distance between the extension engaged arm of the member 17 and the lever hub is considerably greater than the distance from said arm to the rod 18. This is plainly shown in Fig. 5. Since the rod and cable are rigid with the member 17, said cable is rotated to the same arcuate extent as the member 17. The pin 24 is then in one of the side portions of the H-slot and a longitudinal movement imparted to the lever extension subsequent to its lateral movement will pull the cable lengthwise while retaining it in its rotated position as will be evident.

The cable and its housing curve around under the flooring 3, so as to face to the rear as shown in Fig. 1. At its rear end the housing 23 projects into a socket 27, which is secured in a casing 28. This casing replaces the usual cover plate of the transmission housing 4, and projects upwardly from the same as shown in Fig. 6. The cable projects into the casing and is there rigidly secured to a threaded sleeve 29, which engages a tapped bushing 30. This bushing is turnable in a sleeve 31, from which the shifting nub 32 depends. This nub is arranged to engage either one at a time of opposed sockets 33 formed with the shifting forks 34, depending on whether the cable is rotated in one direction or the other with the lateral shifting of the lever in the manner above described. The hubs 35 of the forks slide on horizontal parallel rods 36 mounted in the casing 28, while the forks themselves engage the collars 37 of the sliding gear units. These shifting forks and their associated parts are of a common or standard type and are provided with any suitable form of interlocking and individual position locking means as is customary, and which forms no part of my invention.

A setscrew 38 normally prevents rotation between the bushing and the sleeve 31 so that the two will turn together as a unit. The bushing projects beyond the sleeve 31 at both ends, said ends being turnably supported by the end members of a bracket 39. This bracket slides on supporting rods 40, which are mounted in the casing 28 parallel to and above the rods 36, and work parallel to the bushing 29 and its associated parts.

From the above construction it will be seen that the parts in the transmission to which the cable is attached will move in the same manner and to the same extent as the upper parts which are oppositely connected to and controlled by the movement of the lever. Gear shifting operations may therefore be carried out as readily as when the nub 32 is actually a part of the shift lever itself as is the case in ordinary practice. The provision of the adjustable connecting means between the cable and the shifting-nub sleeve 31 enables the upper member 17 and said nub to be set in their proper neutral positions relative to the H-slot and the shifting forks respectively, when the structure is being assembled or when take-up is necessary by the stretch of the cable.

To similarly adjust the conduit itself, the member 22 in which the upper end of the conduit is secured may be adjustably screwed in the sleeve 21, with a jamb-nut 22a on said member to bear against the adjacent plate 21. It may here be noted that the conduit itself is flexible, while the cable is of the combined push-and-pull and torque type.

I may also mount the emergency brake operating structure in connection with the shift lever supporting means. In this case the brake lever 41 is disposed to one side of the lever 10 and has a hub 42, which projects between and is pivoted on the plate 5 and to the bracket plate 43, which is mounted in connection with the bracket 6 on the side of said plate 5 opposite to the plate 8. The pivot pin of the brake lever hub is offset from the shift lever trunnions so as not to interfere with the mounting of the latter in any way. The brake lever has an extension 44 projecting forwardly from the housing, which at its outer end is connected to a cable 45 enclosed in a flexible housing 46, which is supported at its upper end from the plate 5 by a suitable bracket 47. A pawl and ratchet mechanism 48 of conventional character is associated with the brake lever so that it may be maintained in any position. The housing 46 extends under the flooring the same as the housing 23, but to one side thereof, and leads past the transmission to the brake itself wherever it may be located. The emergency brake lever only moves in one plane and only a longitudinal movement is therefore imparted to its cable.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear shift mechanism for a motor vehicle including a shift lever, means mounting said lever for rocking movement laterally of the vehicle and independent swivel movement lengthwise of the vehicle, a flexible element connected at one end to the turnable and longitudinally movable shift-fork engaging member of the transmission of the vehicle, means between the other end of the element and the lever to rotate said element with the lateral movement of the lever and to move said element lengthwise with the swivel movement of the lever and means directly associated with said last named means to definitely limit the separate movements of the elements.

2. A gear shift mechanism for a motor vehicle including a shift lever projecting rearwardly from under the instrument board of the vehicle, a hub on the forward end of the lever, means engaging the hub to permit of lateral rocking movement of the lever, a support in which said means is turnably mounted arranged to enable said lever to turn in a plane lengthwise of the vehicle, an extension rigid with and projecting radially from the hub, a flexible element connected at its lower end to the turnable and longitudinally movable shift-fork engaging member of the transmission of the vehicle, said element extending thence upwardly to adjacent the extension, and means between said extension and the element to rotate the latter with the rocking of the lever and to move said element lengthwise with the turning movement of the lever.

3. A gear shift mechanism for a motor vehicle including a flexible element, means to effect gear selection and shifting with rotative and lengthwise movements of the element selectively, and means to thus move the element, such means including a shift lever having a hub on one end, means mounting and supporting the hub to enable the lever to be rocked laterally of the hub and to be turned about the hub as an axis, an extension projecting radially from and rigid with the hub, the flexible element terminating at its upper end in facing relation to the extension and lying in a plane intermediate the hub and outer end of the extension, means turnably and slidably supporting said end of the element, and an L-shaped member from one arm of which the element extends at right angles and to which it is rigidly secured, the other arm of said member overhanging the extension and having an opening swivelly engaged by the outer end of the extension.

4. A structure as in claim 3, with means directly associated with said member to definitely limit the rotative and longitudinal movements of the same.

5. A structure as in claim 3, with a pin projecting outwardly from said other arm of the member, and a fixed plate substantially parallel to said arm, said plate having an H-slot into which the pin projects.

6. A gear shift mechanism including a sleeve, a nub to selectively engage the shift-forks of the transmission depending from the sleeve, a support in which said sleeve is turnably mounted, means supporting said support for sliding movement parallel to the axes of the gears of the transmission, an element arranged for both rotative and longitudinal movement projecting axially into the sleeve, a threaded member secured on the portion of the element within the sleeve, a tapped bushing engaging said member and turnable in the sleeve, releasable means to normally hold the sleeve and bushing against relative rotation, and means applied to the other end of the element to thus move the same.

7. A structure as in claim 6, in which said bushing projects beyond the sleeve at both ends, said ends of the bushing being turnably engaged by the support to provide the mounting means for the sleeve.

8. A gear shift mechanism including with the casing of the gears, a sleeve in the casing, a nub depending from the sleeve to selectively engage the shift-forks of the gears, an element arranged for both rotative and longitudinal movement projecting into and adjustably secured at one end to the sleeve, means applied to the other end of the element to control the movements thereof, and means separate from the sleeve and casing supporting the sleeve within the casing for rotative and longitudinal movement therein.

9. A gear shift mechanism including with the casing of the gears, a sleeve in the casing, a nub depending from the sleeve to selectively engage the shift-forks of the gears, an element arranged for both rotative and longitudinal movement projecting into and adjustable secured at one end to the sleeve, means applied to the other end of the element to control the movements thereof, a bracket in which the sleeve is turnably mounted, and members in the casing in transverse planes to the sides of the nub supporting the bracket for sliding movement parallel to the axes of the gears.

In testimony whereof I affix my signature.

BENJAMIN FRANKLIN SCHMIDT.